US008895660B2

(12) United States Patent
Alidedeoglu et al.

(10) Patent No.: US 8,895,660 B2
(45) Date of Patent: *Nov. 25, 2014

(54) POLY(BUTYLENE-CO-ADIPATE TEREPHTHALATE), METHOD OF MANUFACTURE, AND USES THEREOF

(75) Inventors: Husnu Alidedeoglu, Evansville, IN (US); Ganesh Kannan, Evansville, IN (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,983

(22) Filed: Mar. 1, 2012

(65) Prior Publication Data

US 2013/0231440 A1 Sep. 5, 2013

(51) Int. Cl.
*C08G 63/60* (2006.01)

(52) U.S. Cl.
USPC ....... 524/605; 524/537; 525/440.01; 528/302

(58) Field of Classification Search
None
See application file for complete search history.

(56) References Cited

U.S. PATENT DOCUMENTS

| | | | |
|---|---|---|---|
| 2,012,267 A | 8/1935 | Carothers | |
| 3,547,888 A | 12/1970 | Sardessai et al. | |
| 3,634,089 A | 1/1972 | Hamb | |
| 3,669,921 A | 6/1972 | Droke et al. | |
| 3,833,685 A | 9/1974 | Wambach | |
| 3,951,886 A | 4/1976 | Miyake et al. | |
| 3,953,539 A | 4/1976 | Kawase et al. | |
| 3,989,664 A | 11/1976 | Kawase et al. | |
| 4,128,526 A | 12/1978 | Borman | |
| 4,178,277 A | 12/1979 | Gebauer et al. | |
| 4,328,059 A | 5/1982 | Horlbeck et al. | |
| 4,401,804 A * | 8/1983 | Wooten et al. | 528/272 |
| 4,452,933 A | 6/1984 | McCready | |
| 4,482,700 A | 11/1984 | Kuhnrich et al. | |
| 4,500,575 A | 2/1985 | Tiara et al. | |
| 4,617,373 A | 10/1986 | Pruett et al. | |
| 4,659,615 A | 4/1987 | Ishii et al. | |
| 5,266,601 A | 11/1993 | Kyber et al. | |
| 5,268,420 A | 12/1993 | Nishimura et al. | |
| 5,271,985 A | 12/1993 | Tsunashima et al. | |
| 5,378,796 A | 1/1995 | George et al. | |
| 5,391,263 A | 2/1995 | Hepner et al. | |
| 5,391,362 A | 2/1995 | Reinalda et al. | |
| 5,413,681 A | 5/1995 | Tustin et al. | |
| 5,446,079 A | 8/1995 | Buchanan et al. | |
| 5,451,611 A | 9/1995 | Chilukuri et al. | |
| 5,453,479 A | 9/1995 | Borman et al. | |
| 5,498,749 A | 3/1996 | Heise et al. | |
| 5,554,657 A | 9/1996 | Brownscombe et al. | |
| 5,559,159 A | 9/1996 | Sublett et al. | |
| 5,744,503 A | 4/1998 | Smith et al. | |
| 5,817,721 A | 10/1998 | Warzelhan et al. | |
| 5,844,023 A | 12/1998 | Tomka | |
| 5,866,710 A | 2/1999 | Ridland et al. | |
| 5,869,543 A | 2/1999 | Boos et al. | |
| 6,020,393 A | 2/2000 | Khemani | |
| 6,066,714 A | 5/2000 | Putzig et al. | |
| 6,096,809 A | 8/2000 | Lorcks et al. | |
| 6,120,895 A | 9/2000 | Kowitz et al. | |
| 6,133,404 A | 10/2000 | Kang et al. | |
| 6,166,170 A | 12/2000 | Putzig | |
| 6,201,034 B1 | 3/2001 | Warzelhan et al. | |
| 6,231,970 B1 | 5/2001 | Andersen et al. | |
| 6,235,815 B1 | 5/2001 | Loercks et al. | |
| 6,303,738 B1 | 10/2001 | Putzig et al. | |
| 6,472,497 B2 | 10/2002 | Loercks et al. | |
| 6,472,557 B1 | 10/2002 | Pell, Jr. et al. | |
| 6,518,322 B1 | 2/2003 | West | |
| 6,521,717 B1 | 2/2003 | Itoh | |
| 6,573,340 B1 | 6/2003 | Khemani et al. | |
| 6,582,818 B2 | 6/2003 | Haile et al. | |
| 6,649,731 B2 | 11/2003 | Hori et al. | |
| 6,660,211 B2 | 12/2003 | Topolkaraev et al. | |
| 6,703,115 B2 | 3/2004 | Hale et al. | |
| 6,706,843 B1 | 3/2004 | Ishihara et al. | |
| 6,713,595 B2 | 3/2004 | Chung et al. | |
| 6,803,389 B2 | 10/2004 | Kawamura et al. | |
| 6,841,597 B2 | 1/2005 | Bastioli et al. | |
| 6,998,462 B2 | 2/2006 | Duan et al. | |
| 7,037,959 B1 | 5/2006 | Willett et al. | |
| 7,129,301 B2 | 10/2006 | Wu et al. | |
| 7,160,977 B2 | 1/2007 | Hale et al. | |
| 7,166,690 B2 | 1/2007 | Kim | |

(Continued)

FOREIGN PATENT DOCUMENTS

| | | |
|---|---|---|
| DE | 19638488 A1 | 3/1998 |
| EP | 0103531 B1 | 3/1984 |

(Continued)

OTHER PUBLICATIONS

U.S. Appl. No. 13/032,051, filed with USPTO on Feb. 22, 2011.
U.S. Appl. No. 13/032,091, filed with USPTO on Feb. 22, 2011.
U.S. Appl. No. 13/032,121, filed with USPTO on Feb. 22, 2011.
U.S. Appl. No. 13/183,786, filed with USPTO on Jul. 15, 2011.
U.S. Appl. No. 13/183,807, filed with USPTO on Jul. 15, 2011.
U.S. Appl. No. 13/183,821, filed with USPTO on Jul. 15, 2011.
U.S. Appl. No. 13/221,159, filed with USPTO on Aug. 30, 2011.
U.S. Appl. No. 13/397,189, filed with USPTO on Feb. 15, 2012.
U.S. Appl. No. 13/397,200, filed with USPTO on Feb. 15, 2012.

(Continued)

*Primary Examiner* — Susannah Chung
*Assistant Examiner* — Robert T Butcher
(74) *Attorney, Agent, or Firm* — Cantor Colburn LLP; Diderico van Eyl

(57) ABSTRACT

A method for preparing poly(butylene terephthalate-co-adipate)copolymer includes reacting (i) poly(butylene terephthalate-co-adipate)oligomers, wherein the oligomers comprise at least one polymer residue derived from a polyethylene terephthalate component and a quencher, with (ii) a chain extender under conditions sufficient to form the poly(butylene terephthalate-co-adipate)copolymer.

15 Claims, No Drawings

(56) References Cited

U.S. PATENT DOCUMENTS

| | | | |
|---|---|---|---|
| 7,176,251 | B1 | 2/2007 | Bastioli et al. |
| 7,241,832 | B2 | 7/2007 | Khemani et al. |
| 7,241,838 | B2 | 7/2007 | Shelby et al. |
| 7,256,228 | B2 | 8/2007 | Agarwal et al. |
| 7,354,653 | B2 | 4/2008 | Germroth et al. |
| 7,368,503 | B2 | 5/2008 | Hale |
| 7,368,511 | B2 | 5/2008 | Hale et al. |
| 7,737,246 | B2 | 6/2010 | Crawford |
| 7,799,836 | B2 | 9/2010 | Agarwal et al. |
| 7,799,892 | B2 | 9/2010 | Ravi et al. |
| 7,910,645 | B2 | 3/2011 | Ahmed et al. |
| 8,038,658 | B2 | 10/2011 | Kohama |
| 8,088,834 | B2 | 1/2012 | Agarwal et al. |
| 2001/0014388 | A1 | 8/2001 | Bastioli et al. |
| 2002/0111409 | A1 | 8/2002 | Talibuddin |
| 2004/0092672 | A1 | 5/2004 | Bastioli et al. |
| 2004/0254330 | A1 | 12/2004 | Duan et al. |
| 2005/0137304 | A1 | 6/2005 | Strand et al. |
| 2006/0004151 | A1 | 1/2006 | Shaikh et al. |
| 2006/0257676 | A1 | 11/2006 | Itada et al. |
| 2007/0010648 | A1 | 1/2007 | Partridge et al. |
| 2007/0066794 | A1 | 3/2007 | Jernigan |
| 2007/0079945 | A1 | 4/2007 | Noda et al. |
| 2007/0082573 | A1 | 4/2007 | Noda et al. |
| 2007/0082981 | A1 | 4/2007 | Noda et al. |
| 2007/0093634 | A1* | 4/2007 | Salsman et al. ............ 528/44 |
| 2007/0208160 | A1 | 9/2007 | Agarwal et al. |
| 2007/0244242 | A1 | 10/2007 | Agarwal et al. |
| 2007/0264460 | A1 | 11/2007 | Del Tredici |
| 2007/0275242 | A1 | 11/2007 | Gopal et al. |
| 2007/0276069 | A1 | 11/2007 | Agarwal et al. |
| 2008/0039571 | A1 | 2/2008 | Cohoon et al. |
| 2008/0274320 | A1 | 11/2008 | Yokoyama et al. |
| 2008/0311385 | A1 | 12/2008 | Miyazaki et al. |
| 2009/0274885 | A1 | 11/2009 | Egawa |
| 2010/0041831 | A1 | 2/2010 | Chung et al. |
| 2010/0168317 | A1 | 7/2010 | Cahoon-Brister |
| 2010/0168336 | A1 | 7/2010 | Cohoon-Brister |
| 2011/0003964 | A1* | 1/2011 | Agarwal et al. ............ 528/308.6 |
| 2011/0071235 | A1 | 3/2011 | Kannan et al. |
| 2011/0120346 | A1 | 5/2011 | Reisacher et al. |
| 2011/0178265 | A1 | 7/2011 | Tanaka et al. |
| 2012/0232191 | A1 | 9/2012 | Auffermann et al. |
| 2013/0030116 | A1 | 1/2013 | Okaniwa et al. |

FOREIGN PATENT DOCUMENTS

| | | |
|---|---|---|
| EP | 0272417 A2 | 6/1988 |
| EP | 0573680 A1 | 12/1993 |
| EP | 0634435 A1 | 1/1995 |
| EP | 0736557 A1 | 10/1996 |
| EP | 0575349 B2 | 8/2003 |
| EP | 1344765 A1 | 9/2003 |
| EP | 1426404 A1 | 6/2004 |
| EP | 1437377 A1 | 7/2004 |
| EP | 1473324 A1 | 11/2004 |
| EP | 1627893 A1 | 2/2006 |
| EP | 0950678 A1 | 12/2006 |
| EP | 1862507 A1 | 12/2007 |
| EP | 2003159 A1 | 12/2008 |
| EP | 2042548 A1 | 4/2009 |
| EP | 1947145 A2 | 12/2009 |
| GB | 1507358 | 4/1978 |
| GB | 2101617 A | 1/1983 |
| WO | 9527753 | 10/1995 |
| WO | 0185824 A2 | 11/2001 |
| WO | 2005017034 A1 | 2/2005 |
| WO | 2007076384 A2 | 7/2007 |
| WO | 2007089598 A1 | 8/2007 |
| WO | 2007089600 A1 | 8/2007 |
| WO | 2008042384 A1 | 4/2008 |
| WO | 2008085396 A1 | 7/2008 |
| WO | 2009127556 A1 | 10/2009 |
| WO | 2010034711 A1 | 4/2010 |
| WO | 2010077809 A1 | 7/2010 |
| WO | 2011054786 A1 | 5/2011 |
| WO | 2013012706 A1 | 1/2013 |
| WO | 2013012707 A1 | 1/2013 |
| WO | 2013033285 A1 | 3/2013 |

OTHER PUBLICATIONS

U.S. Appl. No. 13/397,210, filed with USPTO on Feb. 15, 2012.
U.S. Appl. No. 13/432,638, filed with USPTO on Mar. 29, 2012.
U.S. Appl. No. 13/433,390, filed with USPTO on Mar. 29, 2012.
Chang et al.; "Copolyesters. VII. Thermal Transitions of Poly(butylene terephthalate-co-isophthalate-co-adipate)s"; vol. 51; Issue 6; Feb. 1994; pp. 999-1004.
English Abstract of EP0007445 A1; Date of Publication Feb. 6, 1980; 1 page.
English Abstract of EP0519367 A1; Date of Publication Dec. 23, 1992; 2 pages.
English Abstract of EP2258545 A1; Date of Publication Dec. 8, 2010; 2 pages.
English Abstract of JP2000109665 A; Date of Publication Apr. 18, 2000; 1 page.
English Abstract of JP2003220645 A; Date of Publication Aug. 5, 2003; 1 page.
English Abstract of JP2004050769 A; Date of Publication Feb. 19, 2004; 1 page.
English Abstract of JP2004098321 A; Date of Publication Apr. 2, 2004; 2 pages.
English Abstract of JP2004204038 A; Date of Publication; 1 page.
English Abstract of JP2005052479 A; Date of Publication Mar. 3, 2005; 2 pages.
English Abstract JP2005220278 A; Aug. 18, 2005; 1 page.
English Abstract JP2008045117 A; Date of Publication Feb. 28, 2008; 2 pages.
English Abstract of JP3776578 B2; Date of Publication May 17, 2006; 1 page.
English Abstract of JP60147430; Date of Publication Aug. 3, 1985; 1 page.
International Search Report for International Application No. PCT/JP2009/064418; International Date of Publication Nov. 10, 2009; Date of Mailing Nov. 17, 2009; 2 pages.
International Search Report for International Application No. PCT/US2012/026046; Date Mailed May 18, 2012; 5 pages.
Written Opinion of the International Search Report for International Application No. PCT/US2012/026046; Date of Mailing May 18, 2012; 8 pages.
International Search Report for International Application No. PCT/US2012/026048; Date Mailed May 18, 2012; 5 pages.
Written Opinion for International Application No. PCT/US2012/026048; Date Mailed May 18, 2012; 8 pages.
International Search Report for International Application PCT/US2012/026051; International Filing Date Feb. 22, 2012; Date of Mailing Aug. 3, 2012; 5 pages.
Written Opinion of the International Search Report for PCT/US2012/026051; International Filing Date Feb. 22, 2012; Date of Mailing Aug. 3, 2012; 9 pages.
Ukielski et al.; "Effect of Chemical Modification of Poly(butylene terephthalate) on elastic properties"; International Polymer Science and Technology, vol. 31, No. 3; Jan. 2004; 6 pages.
Witt et al.; "New Biodegradable Polyester-Copolymers from Commodity Chemicals with Favorable Use Properties"; Journal of Environmental Polymer Degradation; vol. 3; No. 4; no month, 1995; pp. 215-223.
Machine Translation of JP2004098321; Apr. 2004; 6 pages.
JP9087370A with English Abstract; Date of Publication Mar. 31, 1997; 6 pages.
Kleeberg et al.; "Biodegradation of Aliphatic-Aromatic copolyesters by Thermomonospora fusca and Other Thermophilic Compost Isolates"; Applied and Environmental Microbiology; vol. 64, No. 5; 1998, American Society for Microbiology; pp. 1731-1735.
International Search Report for International Patent Application No. PCT/US2012/068913; International Filing Date Dec. 11, 2012; Date of Mailing Mar. 25, 2013; 5 pages.

(56) References Cited

OTHER PUBLICATIONS

International Search Report of International Patent Application No. PCT/US2012/068907; International Date of Filing Dec. 11, 2012; Date of Mailing Mar. 25, 2013; 5 pages.
Written Opinion of the International Search Report for International Patent Application No. PCT/US2012/068907; International Date of Filing Dec. 11, 2012; Date of Mailing Mar. 25, 2013; 8 pages.
International Search Report of International Patent Application No. PCT/US2012/068909; International Filing Date Dec. 11, 2012; Date of Mailing Mar. 21, 2013; 5 pages.
Written Opinion of the International Search Report for International Patent Application No. PCT/US2012/068909; International Filing Date Dec. 11, 2012; Date of Mailing Mar. 21, 2013; 7 pages.
Written Opinion of the International Search Report for International Patent Application PCT/US2012/068913; International Date of Filing Dec. 11, 2012; Date of Mailing Mar. 25, 2013; 8 pages.
U.S. Appl. No. 13/409,898, filed with USPTO on Mar. 1, 2012.
U.S. Appl. No. 13/435,865, filed with USPTO on Mar. 30, 2012.
International Search Report for International Application No. PCT/US2012/046625; International Filing Date Jul. 13, 2012; Date of Mailing Dec. 20, 2012; 4 pages.
Written Opinion of the International Search Report for International Application No. PCT/US2012/046625; International Filing Date Jul. 13, 2012; Date of Mailing Dec. 20, 2012; 6 pages.
International Search Report for International Application No. PCT/US2012/046627; International Filing Date Jul. 13, 2012; Date of Mailing Dec. 12, 2012.
Written Opinion of the International Search Report for International Application No. PCT/US2012/046627; International Filing Date Jul. 13, 2012; Date of Mailing Dec. 12, 2012.
International Search Report for International Application No. PCT/US2012/046629; International Filing Date Jul. 13, 2012; Date of Mailing Dec. 20, 2012; 4 pages.
Written Opinion of the International Search Report for International Application No. PCT/US2012/046629; International Filing Date Jul. 13, 2012; Date of Mailing Dec. 20, 2012; 6 pages.
International Search Report for International Patent Application No. PCT/US2012/052971; International Filing Date Aug. 30, 2012; Date of Mailing Dec. 10, 2012; 5 pages.
Written Opinion of the International Search Report for International Patent Application No. PCT/US2012/052971; International Filing Date Aug. 30, 2012; Date of Mailing Dec. 10, 2012; 7 pages.
DE 19638488 A1 English Abstract; Date of Publication Mar. 26, 1998 2 pages.
JP19840003496 English Abstract; Date of Publication Aug. 3, 1985; 2 pages.
International Search Report for International Application No. PCT/US2012/071902; International Filing Date: Dec. 28, 2012; Date of Mailing Jun. 24, 2013; 5 pages.
Written Opinion of the International Search Report for International Application No. PCT/US2012/071902; International Filing Date: Dec. 28, 2012; Date of Mailing Jun. 24, 2013; 7 pages.
International Search Report for International Application No. PCT/US2012/071904; International Filing Date Dec. 28, 2012; Date of Mailing Jun. 24, 2013; 5 pages.
Written Opinion of the International Search Report for International Application No. PCT/US2012/071904; International Filing Date Dec. 28, 2012; Date of Mailing Jun. 24, 2013; 6 pages.
International Search Report for International Application No. PCT/US2012/071908; International Date of Filing Dec. 28, 2012; Date of Mailing May 7, 2013; 5 pages.
Written Opinion of the International Search Report for International Application No. PCT/US2012/071908; International Date of Filing Dec. 28, 2012; Date of Mailing May 7, 2013; 8 pages.
WO 2009127556 A1 English Abstract; Date of Publication Oct. 22, 2009; 2 pages.
WO 2011054786 A1 English Abstract; Date of Publication May 12, 2011; 1 page.
Patent Cooperation Treaty; International Preliminary Report on Patentability; PCT/US2012/052971; Date of mailing: Mar. 13, 2014, 7 pages.
Scheirs et al.; "Modern Polyesters: Chemistry and Technology of Polyesters and Copolyesters"; 2003; pp. 293-321.

\* cited by examiner

POLY(BUTYLENE-CO-ADIPATE TEREPHTHALATE), METHOD OF MANUFACTURE, AND USES THEREOF

BACKGROUND OF THE INVENTION

This disclosure relates to biodegradable aliphatic-aromatic copolyester compositions, and methods of manufacture of the copolyesters and compositions. These copolyesters and compositions are useful as molded or extruded plastic objects, films, and fibers.

Aliphatic-aromatic copolyesters are often used for the manufacture of biodegradable disposable articles. For example, U.S. Pat. No. 6,020,393 discloses a branched, random aliphatic-aromatic copolyester suitable for forming into biodegradable disposable articles, including poly(butylene-co-adipate terephthalate) (PBAT). U.S. Pat. No. 6,201,034 discloses processes for preparing PBAT by reacting dimethyl terephthalate (DMT) or terephthalic acid (TPA) and adipic acid (AA) with butanediol (BDO). The biodegradability is induced by the incorporation of adipic acid in poly(butylene terephthalate) (PBT). The polymer thus made has a typical melting point ($T_m$) of about 109° C., and a glass transition temperature (Tg) between −25 to −30° C. The polymerization is conducted using a transesterification (TE) catalyst such as a titanium or tin compound.

The present inventors have observed that biodegradable aliphatic-aromatic copolyester product obtained in such a reaction was discolored, often ranging from pink to red in color. This presents a problem in that the aesthetic appearance of a non-white polymer product is an obstacle to employing the polymer in end-uses where the discoloration is apparent and cannot be readily overcome or masked with pigments, whitening agents or fillers. It has further been found that it is difficult to achieve a white color while at the same time maintaining or improving upon other desirable properties of biodegradable aliphatic-aromatic copolyesters such as PBAT. For at least the foregoing reasons, there remains a long unfelt need to develop processes that produce useful biodegradable aliphatic-aromatic copolyesters.

SUMMARY OF THE INVENTION

In an embodiment, a method is provided for preparing poly(butylene terephthalate-co-adipate)copolymer, the method comprising reacting (i) poly(butylene terephthalate-co-adipate)oligomers, wherein the oligomers comprise at least one polymer residue derived from a polyethylene terephthalate component selected from polyethylene terephthalate, polyethylene terephthalate copolymers, and combinations thereof, and a quencher selected from a phosphorus-containing compound, a nitrogen-containing compound, a boron-containing compound, and combinations thereof, with (ii) a chain extender selected from a polyisocyanurate, polyisocyanate, isocyanate and combinations thereof under conditions sufficient to form the poly(butylene terephthalate-co-adipate) copolymer, wherein the copolymer has a melting temperature of 100 to 120° C.; a number average molecular weight of at least 30,000 g/mole; an intrinsic viscosity of at least 1.0; a Tg of −30 to −10° C., and the copolymer comprises a residue derived from the polyethylene terephthalate component.

In another embodiment, a method for preparing poly(butylene terephthalate-co-adipate)copolymer having a melting temperature of 100 to 120° C. comprises reacting 1,4-butanediol and adipic acid in the presence of a catalyst under conditions sufficient to form poly(butylene adipate)oligomers; adding a polyethylene terephthalate component to the poly (butylene adipate)oligomers in the presence of 1,4-butane diol at atmospheric pressure or greater, at a temperature from 190° C. to 270° C., under an inert atmosphere, under conditions sufficient to depolymerize the polyethylene terephthalate component to form the poly(butylene terephthalate-co-adipate)oligomers; adding 0.05 to 1 mole % of a quencher selected from a phosphorus-containing compound, a nitrogen-containing compound, a boron-containing compound, and combination thereof, to the poly(butylene terephthalate-co-adipate)oligomers, based on the moles of catalyst; and reacting the oligomers with 0.01 to 5 mole % of a chain extender selected from a polyisocyanurate, polyisocyanate, isocyanate, and combinations thereof under conditions sufficient to form the poly(butylene terephthalate-co-adipate)copolymer having a melt temperature of 100 to 120°, and comprising at least one residue derived from the polyethylene terephthalate component.

Another method for preparing poly(butylene terephthalate-co-adipate)copolymer having a melt temperature of 100 to 120° C. comprises: reacting (i) a polyethylene terephthalate component selected from the group of polyethylene terephthalate, polyethylene terephthalate copolymers, and combinations thereof, with (ii) a diol component selected from ethylene glycol, propylene glycol, and combinations thereof, in a reactor at atmospheric pressure or greater, in the presence of a catalyst component, under conditions sufficient to depolymerize the polyethylene terephthalate component into a first molten mixture; adding 1,4-butane diol and adipic acid to the molten mixture in the presence of a catalyst component, under conditions sufficient to form a second molten mixture comprising oligomers; adding 0.05 to 1 mole % of a quencher selected from a phosphorus-containing compound, a nitrogen-containing compound, a boron-containing compound, and combinations thereof, to the poly(butylene terephthalate-co-adipate)oligomers, based on the moles of catalyst; and reacting the oligomers with from 0.01-5 mole % of a chain extender selected from an isocyanurate, polyisocyanate, isocyanate and combinations thereof, under conditions sufficient to form the poly(butylene terephthalate-co-adipate)copolymer having a melt temperature of 100 to 120° C., and comprising a residue derived from the polyethylene terephthalate component.

In another embodiment, a poly(butylene terephthalate-co-adipate)copolymer is provided having a melt temperature from 100 to 120° C., wherein the copolymer comprises a residue derived from a polyethylene terephthalate component selected from polyethylene terephthalate, polyethylene terephthalate copolymers, and combinations thereof; a quencher residue; and from 0.05 to 1 weight % of a residue of an isocyanurate, polyisocyanate, isocyanate and combinations thereof.

In another embodiment, a composition comprises the poly (butylene terephthalate-co-adipate)copolymer; and at least one of an additive selected from nucleating agents, antioxidants, UV stabilizers, plasticizers, epoxy compounds, melt strength additives, alcohols, acetates, alcohol-acetate copolymers, crosslinkers, anti-aging agents, retrogradation agents, anti-blocking agents, water, odor-controlling agents, and combinations thereof; and an additional thermoplastic polymer.

An article is described, comprising the above-described compositions.

A method of forming an article comprising molding, coating, calendaring, shaping, or extruding the above-described compositions.

DETAILED DESCRIPTION OF THE INVENTION

The present inventors have surprisingly found that a poly (butylene-co-adipate terephthalate)copolymer prepared by reacting poly(butylene-co-adipate terephthalate)oligomers with a chain extender has an advantageous combination of properties. In a particularly advantageous feature, the poly (butylene-co-adipate terephthalate)oligomers are prepared by depolymerizing aromatic polyester, in particular a polyethylene terephthalate homopolymer, copolymer, or combination thereof by reaction with butane diol (BDO) and conducting in-situ reaction with adipic acid and a second dihydric alcohol. Use of the polyethylene terephthalate component an aromatic carboxylic acid source allows recycle of scrap polyesters. Surprisingly, the advantageous properties of the copolyesters are obtained even in the presence of a residue from the aromatic polyester if a quencher is added to the depolymerization mixture after the oligomers are formed.

The term "recycle" as used herein refers to any component that has been manufactured and either used or intended for scrap. Thus, a recycle polyester can be polyester that has been used, for example in a drinking bottle, or that is a byproduct of a manufacturing process, for example that does not meet a required specification and therefore would otherwise be discarded or scrapped. Recycle materials can therefore contain virgin materials that have not been utilized. The polyethylene terephthalate component from which the aliphatic-aromatic copolyester is made can be in a variety of forms. Generally, in the case of PET, the PET component includes recycle (scrap) PET in flake, powder/chip, film, or pellet form. Before use, the PET is generally processed to remove any impurities such as paper, adhesives, polyolefin, e.g., polypropylene, polyvinyl chloride (PVC), nylon, polylactic acid (an aliphatic polyester), and other contaminants.

The prefix "bio-" or "bio-derived" as used herein means that the compound or composition is ultimately derived from a biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

The singular forms "a," "an," and "the" include plural referents unless the context clearly dictates otherwise. "Or" means "and/or." "Combinations thereof" is not limiting, and means that at least one of the named components is present, together with another of the named component or a component of like nature. Further unless defined otherwise, technical, and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

The term "random copolymer," as used in this application refers to a copolymer that includes macromolecules in which the probability of finding a given monomeric unit at any given site in the chain is independent of the nature of the adjacent units.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group," "isophthalic acid group," "ethylene glycol group," "butanediol group," and "diethylene glycol group" being used to indicate, for example, the weight percent (wt. %) of the group in a molecule, the term "isophthalic acid group(s)" means the group or residue of isophthalic acid having the formula (—O(CO)C$_6$H$_4$(CO)—), the term "terephthalic acid group" means the group or residue of isophthalic acid having the formula (—O(CO)C$_6$H$_4$(CO)—), the term "diethylene glycol group" means the group or residue of diethylene glycol having the formula (—O(C$_2$H$_4$)O(C$_2$H$_4$)—), the term "butanediol group" means the group or residue of butanediol having the formula (—O(C$_4$H$_8$)—), and the term "ethylene glycol group" means the group or residue of ethylene glycol having the formula (—O(C$_2$H$_4$)—).

The butane diol, adipic acid, or any other component of the copolyesters can be derived from a biological source. In an embodiment all or a portion of the butane diol is derived from a biological source. "Bio-derived diols" as used herein refers to alcohols other than those named and derived from a biological source, e.g., various pentoses, hexoses, and the like.

The poly(butylene-co-adipate terephthalate)copolymers described herein comprise adipic acid groups, butane diol groups, and aromatic dicarboxylic acid groups derived from the poly(ethylene terephthalate) component, i.e., a poly(ethylene terephthalate)homopolymer, a poly(ethylene terephthalate)copolymer, or a combination thereof. In other words, the poly(butylene-co-adipate terephthalate)copolymers contains aromatic dicarboxylic acid groups incorporated into the copolyester from the depolymerization of the poly(ethylene terephthalate).

Processes for preparing copolyesters by depolymerizing aromatic polyesters in the presence of polyols are known in the art. For example, U.S. Pat. No. 5,451,611 describes a process for converting waste polyethylene terephthalate to either poly(ethylene-co-butylene terephthalate) or polybutylene terephthalate by reaction with BDO. A principal objective of U.S. Pat. No. 5,451,611 was to provide a process for converting PET waste directly to another high value polymer without breaking down the PET to its constituent monomers or oligomers. The patent discloses numerous examples in which a variety of polymers have a combination of diols incorporated at various ratios of amounts. Example 11 of U.S. Pat. No. 5,451,611 patent shows a PBT polymer being formed with a complete replacement of EG by BDO. U.S. Pat. No.

5,266,601 and U.S. Pat No. 20090275698 (A1) describe a process for making PBT from PET by reacting PET with BDO.

The poly(butylene-co-adipate terephthalate)copolymers therefore comprise isophthalic acid groups, terephthalic acid groups, and combinations thereof derived from the PET component. The copolyesters further comprise other residues present in the poly(ethylene terephthalate) component or arising from the depolymerization process, including catalyst residues from the manufacture of the poly(ethylene terephthalate) component, residues from additives in the poly(ethylene terephthalate) component, or residues arising from side reactions that occur during manufacture of the poly(ethylene terephthalate) component and/or the reaction of the BDO, the adipic acid, and the poly(ethylene terephthalate) component. For example, in addition to butane diol groups, dihydric alcohol groups incorporated into the copolyester can be derived from any dihydric alcohol that reacts with the adipic acid and the aromatic dicarboxylic acid to form the copolyester, such as groups derived from ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), bio-derived diols, hexylene glycols, and a combination thereof. In another embodiment, the dihydric alcohol is selected from 1,4-butanediol, 1,3-propanediol, ethylene glycol, and combinations thereof. Such groups can arise, for example from a polyethylene terephthalate component containing polyethylene terephthalate copolymers.

Residues derived from the poly(ethylene terephthalate) component can be ethylene glycol groups, diethylene glycol groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In an embodiment, the residue derived from the poly(ethylene terephthalate) component comprises ethylene glycol groups, diethylene glycol groups, and more particularly a combination of ethylene glycol groups and diethylene glycol groups.

Accordingly, our invention includes embodiments in which the residue derived from the poly(ethylene terephthalate) component includes individual elements and combinations of the foregoing materials. In an embodiment, the residue derived from the poly(ethylene terephthalate) component comprises the cis isomer of 1,3-cyclohexanedimethanol, cis isomer of 1,4-cyclohexanedimethanol, trans isomer of 1,3-cyclohexanedimethanol, trans isomer of 1,4-cyclohexanedimethanol and combinations thereof. In one embodiment, the residue derived from the poly(ethylene terephthalate) component includes a combination of ethylene glycol and diethylene glycol groups, and can further comprise the cis isomer of 1,3-cyclohexanedimethanol, the cis isomer of 1,4-cyclohexanedimethanol, the trans isomer of 1,3-cyclohexanedimethanol, trans isomer of 1,4-cyclohexanedimethanol, or combinations thereof. In an embodiment, the residue derived from the polyethylene terephthalate component comprises ethylene glycol groups, diethylene glycol groups, the cis isomer of cyclohexanedimethanol, the trans isomer of cyclohexanedimethanol, and combinations thereof. In an embodiment, the residue derived from the poly(ethylene terephthalate) component comprises ethylene glycol groups, diethylene glycol groups, and cobalt-containing compounds The residues can be present in a total amount from more than 0 to 10 wt. % of the copolymer, for example 0.01 to 8 wt. %, 0.05 to 6 wt. %, 0.1 to 5 wt. %, 0.1 to 2.5 wt. %, or 0.1 to 1.0 wt. % of the copolymer.

Catalysts effective to depolymerize the poly(ethylene terephthalate) component and form the oligomers are known, and include, for example, tin compounds, titanium compounds, and combinations thereof as well as many other metal catalysts and combinations of metal catalysts that have been disclosed in the literature. Specific examples of catalysts for polymerization and/or transesterification include antimony compounds, titanium isopropoxide, manganese diacetate, antimony oxide, dibutyl tin diacetate, zinc chloride, or combinations thereof. The amount of catalyst to obtain an acceptable depolymerization/oligomerization rate at the desired temperatures will vary, and can be determined by experimentation. For example, the catalyst amount can be 1 to 1000, 1 to 5000 ppm, or more, based on the weight of the poly(ethylene terephthalate) component. In an embodiment, the catalyst is a tetraisopropyl titanate, available from DuPont under the tradename TYZOR.

Conditions effective to depolymerize the poly(ethylene terephthalate) component and form the oligomers can vary depending on the particular poly(ethylene terephthalate) component, its purity, type of catalyst, amount of reactants, and like considerations, and can be determined by experimentation. For example, the depolymerization can be conducted at a temperature from 150 to 300° C. under atmospheric or reduced pressure and inert atmosphere.

The poly(butylene-co-adipate terephthalate)oligomers are treated with a quencher prior to reaction with the chain extender, or at the same time that the chain extender is added to the oligomers. The quencher can be a phosphorus-containing compound, a nitrogen-containing compound, a boron-containing compound, or a combination thereof.

Phosphorus-containing compounds include phosphoric acid, poly(phosphoric acid), phosphorous acid, monobutyl phosphate, dibutyl phosphate, monoalkyl phosphates, dialkyl phosphates, and combinations thereof.

Nitrogen-containing Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

Generally, the quencher is selected from phosphoric acid, phosphorous acid, boric acid, and combinations thereof.

In an embodiment of the method, the quencher is added to the poly(butylene terephthalate-co-adipate)oligomers in an amount of 0.05 to 1 mole % based on the moles of catalyst. In another embodiment of the method, the amount of the quencher is from 0.05 to 1 mole %, based on total moles of terephthalic acid, adipic acid and 1,4 butanediol. In an embodiment, the poly(butylene terephthalate-co-adipate)copolymer contains 0.05 to 1 mol % of the quencher residue.

The poly(butylene-co-adipate terephthalate)copolymer is produced by reacting poly(butylene-co-adipate terephthalate)oligomer with a chain extender. In an embodiment, the chain extender is selected from mononuclear isocyanate, binuclear isocyanate, trinuclear isocyanate, tetra or higher nuclear isocyanate and their mixtures, diisocyanate selected from the group consisting of tolylene 2,4-diisocyanate, tolylene 2,6-diisocyanate, 2,4'-diphenylmethane diisocyanate, naphthylene-1,5-diisocyanate, xylylene diisocyanate, hexamethylene diisocyanate, isophorone diisocyanate, and methylenebis(2-isocyanatocyclohexane).

In an embodiment, the chain extender is a combination comprising, based on the total weight of the combination, from 45 to 80 wt. % of a chain extender selected from a mononuclear isocyanurate, a chain extender containing two functional groups that react with an end group of the oligomer, or combinations thereof; from 13 to 25 wt. % of a chain extender selected from a binuclear isocyanurate, a chain extender containing three functional groups that react with an end group of the oligomer, and combinations thereof; from 5 to 12 wt. % of a chain extender selected from a trinuclear isocyanurate, a chain extender containing four functional groups that react with an end group of the oligomer, and combinations thereof; and from 2 to 18 wt. % a tetra- or higher-nuclear isocyanurate.

In an embodiment of the method, the poly(butylene terephthalate-co-adipate)copolymers are prepared by reacting the poly(butylene terephthalate-co-adipate)oligomers with 0.05 to 5 weight % of a chain extender selected from a polyisocyanurate, polyisocyanate, isocyanate, and combinations thereof. In an embodiment of the poly(butylene terephthalate-co-adipate)copolymer, the chain extender residue can be present from 0.05 to 5 weight % based on total weight of poly(butylene terephthalate-co-adipate)copolymer. In another embodiment the amount of chain extender can be present from 0.1 to 1 weight %.

Conditions for reacting the oligomers with the chain extender are known in the art, and will depend on the specific reactants, their amounts, and desired reaction time. For example, the chain extension can be conducted in the melt, for example at 100 to 120° C. at atmospheric or reduced pressure, optionally under an inert atmosphere.

The poly(butylene terephthalate-co-adipate)copolymers have an advantageous combination of properties. For example, the copolymers can have a melt temperature of 105 to 125° C., 110 to 125°, 100 to 120° C., 100 to 115° C., or 100 to 110° C. The copolymers can have a Tg of −30 to −10° C., −25 to −10° C., or −20 to −10° C.

The copolymers can further be manufactured to have a desired number average molecular weight, for example greater than 30,000 g/mole, 30,000 to 300,000 g/mole, 40,000 to 200,000 g/mole, or 45,000 to 150,000 g/mole.

In addition, the copolymers can have an I.V. of greater than 1.0, greater than 1.2, greater than 1.5 deciliter per minute (dL/minute) as measured in a 60:40 by weight phenol/1,1,2, 2-tetrachloroethane mixture at 23° C.

Specifically the copolymer has a melt temperature of 100 to 125° C.; a number average molecular weight of at least 30,000 g/mole; an intrinsic of viscosity (I.V.) of at least 1.0 dL/minute; and a Tg of −30 to −10° C., and the copolymer comprises a residue derived from the polyester residue component. The manufacturing conditions can be adjusted to achieve the desired combination of properties. For example, the copolymers can have a melt temperature of 100 to 115° C.; a number average molecular weight of 40,000 to 200,000 g/mole; an intrinsic of viscosity (I.V.) of at least 1.2 dL/minute; and a Tg of −25 to −10° C. Other combinations of properties within these ranges are possible.

The composition includes, in addition to the copolyesters as described above, other components combined with the copolyester, for example other polymers and additives, used in the formulation of molding compositions. Examples of the polymers include aliphatic polyesters, aromatic polycarbonates, aliphatic polycarbonates, starches, aromatic polyesters, cycloaliphatic polyesters, polyesteramides, combinations thereof, and the like. The polymers can be wholly or partially bio-derived, including petroleum-derived aromatic polyesters and bio-derived aromatic polyesters. In the art, chain extenders such as epoxides, bisoxazolines, biscaprolactams, dianhydrides, and the like have been reported for use in polyesters. Among these, epoxides are most widely used on a commercial scale due to their relatively low cost and availability of a variety of structures.

In a specific embodiment the copolyester is combined with an aliphatic polyester, for example poly(lactic acid), poly (hydroxyalkanoate), poly(butylene succinate), poly(butylene adipate), poly(butylene succinate adipate) and poly(caprolactone), or a combination thereof. Polyhydroxyalkanoates (PHAs) are linear polyesters produced in nature by bacterial fermentation of sugar or lipids, and include, for example, poly(R-3-hydroxybutyrate) (PHB or poly(3HB)).

In another specific embodiment the copolyester is combined with an aromatic polyester, for example a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly (ethylene terephthalate), post-consumer poly(ethylene terephthalate), recycled poly(trimethylene terephthalate), recycled copolyesters of terephthalic acid with ethylene glycol and cyclohexane dimethanol, or a combination thereof.

The amounts of the copolyesters and the additives vary depending on the desired properties of the biodegradable composition. In an embodiment the additives are present in an amount from 2 to 90 wt. %, for example from 2 to 40 wt. % or from 40 to 90 wt. %, based on the total weight of the composition. When the copolyester is used with starch, the amount of starch can range from 40 to 90 wt. %, and the amount of polyester can range from 10 to 60%, based on the total weight of the total composition. When the copolyester is used in conjunction with polylactic acid, the amount of the copolyester can range from 40 to 90 wt. % and the amount of polylactic acid can range from 10 to 60 wt. %, specifically 40 to 60%, based on the total weight of the composition.

The composition can also contain from 0.01 to 45 wt. %, based on the total weight of the composition, of an additive selected from alcohols, acetates, alcohol-acetate copolymers, and combinations thereof. Additionally, the composition can contain from 0.01 to 2 wt. %, based on the weight of the composition, of an additive selected from crosslinkers, antiaging agents, retrogradation agents, anti-blocking agents, water, odor-controlling agents, and combinations thereof.

Additives ordinarily incorporated into polymer compositions can be used, with the proviso that the additives are selected so as to not significantly adversely affect the desired properties of the composition, for example, biodegradability, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, flame retardants, anti-drip agents, and radiation stabilizers. Combinations of additives can be used, for example an antioxidant, a UV absorber, and a mold release agent. The total amount of additives (other than any impact modifier, filler, or reinforcing agents) is generally 0.01 to 5 wt. %, based on the total weight of the composition. In a specific embodiment, from 0.01 to 5.00 wt. % of a nucleating agent, antioxidant, UV stabilizer, plasticizers, epoxy compound, melt strength additive, or a combination thereof is used.

Advantageously, the copolyester and compositions containing the copolyester can be biodegradable. This means that the copolyester and compositions containing the copolyester exhibit aerobic biodegradability, as determined by ISO 14855-1:2005. ISO 14855-1:2005, as is known, specifies a method for the determination of the ultimate aerobic biodegradability of plastics, based on organic compounds, under controlled composting conditions by measurement of the amount of carbon dioxide evolved and the degree of disintegration of the plastic at the end of the test. This method is designed to simulate typical aerobic composting conditions for the organic fraction of solid mixed municipal waste. The test material is exposed to an inoculum, which is derived from compost. The composting takes place in an environment wherein temperature, aeration and humidity are closely monitored and controlled. The test method is designed to yield the percentage conversion of the carbon in the test material to evolved carbon dioxide as well as the rate of conversion. Also specified is a variant of the method, using a mineral bed (vermiculite) inoculated with thermophilic microorganisms obtained from compost with a specific activation phase, instead of mature compost. This variant is designed to yield the percentage of carbon in the test substance converted to carbon dioxide and the rate of conversion. Generally, our copolyesters (and compositions containing copolyesters) exhibit a biodegradation (measured in % of solid carbon of the test item that is converted into gaseous, mineral C in the form of $CO_2$), which is at least 30% after 75 days. In one embodiment, the copolyesters (and compositions containing copolyesters) exhibit a biodegradation, which is at least 40% or 50% after 75 days. The biodegradation of the copolyesters (and compositions containing copolyesters) can range from at least 30% to 50%, or at least 30% to 60%, or at least 30% to 70%.

Advantageously, useful articles can be made from the copolyester and compositions containing the copolyester. In a specific embodiment, an article is extruded, calendared, extrusion molded, blow molded, solvent cast or injection molded from the copolymer or the composition containing the copolymer. The article can be a film or a sheet. When the article is a film, the article can be formed by extrusion molding or calendaring the copolyester or composition containing the copolyester. The copolyesters and compositions containing the copolyesters are useful for films, for example film packaging applications, among other applications.

As stated above, various combinations of the foregoing embodiments can be used. The invention is further described in the following illustrative examples in which all parts and percentages are by weight unless otherwise indicated.

EXAMPLES

Materials

Following is a list of materials, acronyms, and selected sources used in the examples.

ADA: Adipic Acid (from INVISTA)

BDO: 1,4-Butanediol (from BASF, with a purity specification of 99.5 wt. %)

Phosphoric Acid: Phosphoric Acid (from Acros, grade/purity 98%)

TPT: Tetraisopropyl titanate (from DuPont, commercial Tyzor grade)

PBT-co-adipate: Poly(butylene terephthalate-co-adipate)

PET: Poly(ethylene terephthalate)

Recycle PET: Recycle PET in the form of flakes or pellets was obtained from a commercial vendor headquartered in India.

Methods and Procedures

The reported $L^*$, $a^*$, $b^*$ values were obtained through the diffuse reflectance method acquired on a Gretag Macbeth Color-Eye 7000A with D65 illumination. The term "white," as used in this application, means that the material being described as white exhibits an $L^*$ value that is at least 75, or at least 80, or at least 85 with a corresponding set of "a" and "b" values that are substantially close to 0, (less than 5 units on the CIE color scale), where the "a" represents red and green hues and "b" represents blue and yellow hues of the white material on the CIE LAB color scale. The $L^*$ value can range from 75, or 80, or 85 to 100. The "$L^*$, a, b" method for describing colors is well known and developed by the CIE (Commission Internationale de l'Eclairage). The CIE provides recommendations for colorimetry by specifying the illuminants, the observer and the methodology used to derive values for describing color 3 coordinates are utilized to locate a color in a color space which is represented by $L^*$, $a^*$ and $b^*$. When a color is expressed in CIELAB, $L^*$ defines lightness, if a value is closer to 0 it means total absorption or how dark a color is. If the $L^*$ value is closer to 100 it means total reflection or how light a color is. $a^*$ denotes how green or red a color is, whereas $b^*$ represents how blue or yellow a color is.

Intrinsic viscosity (I.V.) was determined with an automatic Viscotek Microlab® 500 series Relative Viscometer Y501. In a typical procedure, 0.5000 g of polymer sample was fully dissolved in a 60/40 mixture (by vol) of % phenol/1,1,2,2-tetrachloroethane solution (Harrell Industries).

Dynamic scanning calorimetry (DSC), Perkin Elmer DSC 7 equipped with Pyris DSC 7 software, was used to determine melting characteristics of the polymers synthesized as well as the thermal properties of the corresponding monomers. In a typical procedure, a polymer sample (10-20 mg) was heated from −50° C. to 200° C. (20° C./min), held at 200° C. for 1 min, cooled back to −50° C. (20° C./min), then held at −50° C. for 1 min, and the above heating/cooling cycle was repeated. The second heating cycle is usually used to obtain the $T_g$ and $T_m$ data.

Example 1

The purpose of Example 1 was to prepare the polyester PBT-co-adipate derived from post-consumer PET, adipic acid (ADA), and 1,4-butanediol (BDO) using phosphoric acid as a catalyst quencher and hexamethylene diisocyanate as a chain extender. The materials, amounts, and reaction conditions are shown in Table 1.

TABLE 1

| | | Materials and Conditions for Example 1. | | | | | | | |
|---|---|---|---|---|---|---|---|---|---|
| Ex. No. | Scale of Reaction (g) | PET:BDO (mol/mol) | ADA:BDO (mol/mol) | Phosphoric Acid (ppm) | Catalyst Amount (ppm) | EI Temp (° C.) | EI Time (min) | Poly Temp. (° C.) | Poly Time (min) |
| 1 | 143 | 0.39 | 0.39 | 250 | 250 | 220 | 120 | 240 | 15 |

Techniques and Procedures

First, 50 grams of BDO and 36.5 grams of ADA were introduced into a three neck round bottom flask. The reactor was placed in an oil bath the temperature of which was adjusted to 175° C. Then, 250 ppm of TPT was added to the reactor under inert atmosphere. The ester interchange temperature was increased to 220° C. at a rate of 2° C./min while stirring at 260 rpm under nitrogen. After the evolution of water ceased, excess butanediol was distilled out under reduced pressure. Then, 48 grams of post-consumer PET and 50 grams of BDO were introduced into the reactor while stirring at 220° C. The mixture was heated over the course of 2 hours. Then, 0.5 ml of phosphoric acid solution in water (0.1 g/ml) was added. The temperature of the reaction mixture was increased to 240° C. When all the PET flakes were melted, the vacuum was reduced to below 1 torr. After achieving desired oligomers, the vacuum was stopped and 0.7 ml of hexamethylene diisocyanate was added into the reactor. The melt was mixed with hexamethylene diisocyanate for 15 minutes under nitrogen atmosphere. After achieving the desired intrinsic viscosity, the reaction was stopped.

Results

Table 2 shows the Tg, Tm, molecular weight data (obtained from gel permeation chromatography (GPC) using polystyrene standards), intrinsic viscosity (I.V.), and color obtained from visual observation of Example 1.

TABLE 2

| | | | Results for Example 1 | | | | | |
|---|---|---|---|---|---|---|---|---|
| Ex. No. | IV (dL/min) | $T_m$ (° C.) | $T_g$ (° C.) | PDI | Mn | Mw | L* | a* | b* |
| 1 | 1.94 | 102 | −22 | 6.8 | 41000 | 280000 | 75.8 | 0.9 | 11.8 |

Table 3 describes the compositional analysis of Example 1 obtained through proton NMR. The number reported therefore reflects the degree of incorporation of the named unit in the polymer.

TABLE 3

| | Compositional analysis result of Example 1 | | | | |
|---|---|---|---|---|---|
| Ex. No. | Isophthalic Acid (mol %) | Terephthalic acid (mol %) | ADA (mol %) | BDO (mol %) | EG (mol %) |
| 1 | 0.6 | 25.1 | 24.3 | 41.7 | 8.3 |

Discussion

A novel approach was used to prepare PBAT copolyesters derived through post-consumer PET. This approach includes first the preparation of the oligomers of PBAT made through the melt condensation of ADA, BDO, and PET in the presence of phosphoric acid catalyst quencher. The resulting oligomers exhibited white color due to lower reaction temperature and successful quenching of catalyst. Then the oligomers were chain extended using hexamethylene diisocyanate at the same temperature and atmospheric pressure. A sharp viscosity increase was observed within 15 minutes indicating that chain extension through hexamethylene diisocyanate is rapid and quantitative.

The results shown in Table 2 demonstrate that the current process enabled the co-polyester to obtain a very high IV. The melting temperature of Example 1 is 15° C. lower compared to a commercial PBT-co-adipate ($T_m$=117° C.) obtained from printed BASF data sheet.

The resulting copolyesters include isophthalic acid and EG in its backbone, which arises from the Recycle PET. The mole percent of EG mol in the backbone is high compared to the PBT-co-adipate prepared from PET via other process, likely due to lack of vacuum during the chain extension process.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method for preparing poly(butylene terephthalate-co-adipate) copolymer, the method comprising reacting
    (i) poly(butylene terephthalate-co-adipate) oligomers, wherein the oligomers comprise
    at least one polymer residue derived from a polyethylene terephthalate component selected from the group consisting of polyethylene terephthalate, polyethylene terephthalate copolymers, and combinations thereof, and
    a quencher selected from the group consisting of a phosphorus-containing compound, a nitrogen-containing compound, a boron-containing compound, and combinations thereof, with
    (ii) a chain extender selected from the group consisting of a polyisocyanurate, polyisocyanate, isocyanate, and combinations thereof
    under conditions sufficient to form the poly(butylene terephthalate-co-adipate) copolymer, wherein the copolymer has
    a melting temperature of 100 to 120° C.;
    a number average molecular weight of at least 30,000 g/mole;
    an intrinsic viscosity of at least 1.0 deciliter per minute;
    a $T_g$ of −30 to −10° C., and
    the copolymer comprises a residue derived from the polyethylene terephthalate component.

2. The method of claim 1, comprising obtaining the poly(butylene terephthalate-co-adipate) oligomers by:
    (a) reacting 1,4-butanediol and adipic acid in the presence of a catalyst under conditions sufficient to form poly(butylene adipate) oligomers;
    (b) combining the polyethylene terephthalate component and the poly(butylene adipate) oligomers in the presence of 1,4-butane diol at atmospheric pressure or greater, at a temperature from 190° C. to 270° C., under an inert atmosphere, under conditions sufficient to depolymerize the polyethylene terephthalate component to form said poly(butylene terephthalate-co-adipate) oligomers; and (c) adding 0.05 to 1 mole % of phosphoric acid quencher to the poly(butylene terephthalate-co-adipate) polymer, based on the moles of catalyst.

3. The method of claim 1, comprising obtaining the poly(butylene terephthalate-co-adipate) oligomers by:
(a) reacting
(i) a polyethylene terephthalate component selected from the group consisting of polyethylene terephthalate, polyethylene terephthalate copolymers, and combinations thereof, with
(ii) a diol component selected from the group consisting of ethylene glycol, propylene glycol, and combinations thereof, in a reactor at atmospheric pressure or greater, in the presence of a catalyst component, under conditions sufficient to depolymerize the polyethylene terephthalate component into a first molten mixture; and
(b) adding 1,4-butane diol and adipic acid to the molten mixture in the presence of a catalyst component, under conditions sufficient to form a second molten mixture comprising the poly(butylene terephthalate-co-adipate) oligomers; and
(c) adding 0.05 to 1 mole % of phosphoric acid quencher to the poly(butylene terephthalate-co-adipate) oligomers, based on the moles of catalyst.

4. A method for preparing poly(butylene terephthalate-co-adipate) copolymer having a melting temperature of 100 to 120° C., the method comprising obtaining the poly(butylene terephthalate-co-adipate) oligomers by:
reacting 1,4-butanediol and adipic acid in the presence of a catalyst under conditions sufficient to form poly(butylene adipate) oligomers;
adding a polyethylene terephthalate component to the poly(butylene adipate) oligomers in the presence of 1,4-butane diol at atmospheric pressure or greater, at a temperature from 190° C. to 270° C., under an inert atmosphere, under conditions sufficient to depolymerize the polyethylene terephthalate component to form the poly(butylene terephthalate-co-adipate) oligomers; and
adding 0.05 to 1 mole % of a phosphoric acid quencher to the poly(butylene terephthalate-co-adipate) oligomers, based on the moles of catalyst;
wherein the poly(butylene terephthalate-co-adipate) oligomers are reacted with the chain extender in an amount of 0.01 to 5 weight % under conditions sufficient to form the poly(butylene terephthalate-co-adipate) copolymer having a melt temperature of 100 to 120°, and comprising at least one residue derived from the polyethylene terephthalate component.

5. A method for preparing poly(butylene terephthalate-co-adipate) copolymer having a melt temperature of 100 to 120° C., the method comprising obtaining the poly(butylene terephthalate-co-adipate) oligomers by:
reacting
(i) a polyethylene terephthalate component selected from the group consisting of polyethylene terephthalate, polyethylene terephthalate copolymers, and combinations thereof, with
(ii) a diol component selected from the group consisting of ethylene glycol, propylene glycol, and combinations thereof, in a reactor at atmospheric pressure or greater, in the presence of a catalyst component, under conditions sufficient to depolymerize the polyethylene terephthalate component into a first molten mixture;
adding 1,4-butane diol and adipic acid to the molten mixture in the presence of a catalyst component, under conditions sufficient to form a second molten mixture comprising the poly(butylene terephthalate-co-adipate) oligomers; and
adding 0.05 to 1 mole % of a quencher to the poly(butylene terephthalate-co-adipate) oligomers, based on the moles of catalyst;
wherein the poly(butylene terephthalate-co-adipate) oligomers are reacted with from 0.01-5 weight % based on the total weight of the poly(butylene terephthalate-co-adipate) copolymer of the chain extender under conditions sufficient to form the poly(butylene terephthalate-co-adipate) copolymer having a melt temperature of 100 to 120° C., and comprising a residue derived from the polyethylene terephthalate component.

6. The method of claim 5 wherein the poly(butylene terephthalate-co-adipate) copolymer has a molecular weight of at least 30,000; an I.V. of at least 1.0 deciliter per minute; and $T_g$ of −30 to −10° C.

7. The method of claim 1, wherein the amount of quencher is from 0.05 to 1 mole %, based on total moles of terephthalic acid, adipic acid and 1,4 butanediol.

8. The method of claim 1, wherein the quencher is selected from the group consisting of phosphoric acid, phosphorous acid, boric acid, nitrogen containing compound and combinations thereof.

9. The method of claim 1, wherein the chain extender is selected from the group consisting of mononuclear isocyanate, binuclear isocyanate, trinuclear isocyanate, tetra or higher nuclear isocyanate and their mixtures, diisocyanate selected from the group consisting of tolylene 2,4-diisocyanate, tolylene 2,6-diisocyanate, 2,4'-diphenylmethane diisocyanate, naphthylene-1,5-diisocyanate, xylylene diisocyanate, hexamethylene diisocyanate, isophorone diisocyanate, and methylenebis (2-isocyanatocyclohexane).

10. The method of claim 8, wherein the chain extender is a combination comprising, based on the total weight of the combination,
from 45 to 80 wt. % of a chain extender selected from the group consisting of a mononuclear isocyanurate, a chain extender containing two functional groups that react with an end group of the oligomer, and combinations thereof;
from 13 to 25 wt. % of a chain extender selected from the group consisting of a binuclear isocyanurate, a chain extender containing three functional groups that react with an end group of the oligomer, and combinations thereof;
from 5 to 12 wt. % of a chain extender selected from the group consisting of a trinuclear isocyanurate, a chain extender containing four functional groups that react with an end group of the oligomer, and combinations thereof; and
from 2 to 18 wt. % a tetra- or higher-nuclear isocyanurate.

11. The method of claim 1, wherein the polymer residue derived from a polyethylene terephthalate component is a dihydric alcohol selected from the group consisting of ethylene glycol, 1,2-propylene glycol, 1,3-propylene glycol, 1,2-butanediol, 2,3-butanediol, 1,4-butanediol, tetramethyl cyclobutanediol, isosorbide, hexylene glycol, 1,3-cyclohexanedimethanol isomers, 1,4-cyclohexanedimethanol isomers, a bio-derived diol, and combinations thereof.

12. The method of claim 11, wherein the dihydric alcohol is selected from the group consisting of 1,4-butanediol, 1,3-propanediol, ethylene glycol, and combinations thereof.

13. The method of claim 1, wherein the polymer residue derived from a polyethylene terephthalate component is an aromatic dicarboxylic acid compound selected from the group consisting of terephthalic acid or di(C1-3)alkyl ester thereof, isophthalic acid or di(C1-3)alkyl ester thereof, naphthalic acid or di(C1-3)alkyl ester thereof, and combinations thereof.

14. The method of claim 13, wherein the aromatic dicarboxylic acid compound is terephthalic acid or a di($C_{1-3}$)alkyl ester thereof.

15. The method of claim 1, wherein the polymer residue derived from a polyethylene terephthalate component comprises a residue selected from the group consisting of dimethyl isophthalate, cyclohexane dimethanol, ethylene glycol, diethylene glycol, triethylene glycol, ethylene glycol groups, diethylene glycol groups, isophthalic acid groups and combinations thereof.

* * * * *